(12) United States Patent
Nair et al.

(10) Patent No.: US 10,924,520 B2
(45) Date of Patent: Feb. 16, 2021

(54) ONLINE CHARGING MECHANISMS DURING OCS NON-RESPONSIVENESS

(71) Applicant: MICROSOFT TECHNOLGY LICENSING, LLC, Redmond, WA (US)

(72) Inventors: Girish Nair, Nashua, NH (US); Narsi Veldanda, Northboro, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 15/838,980

(22) Filed: Dec. 12, 2017

(65) Prior Publication Data

US 2018/0167424 A1 Jun. 14, 2018

Related U.S. Application Data

(60) Provisional application No. 62/433,414, filed on Dec. 13, 2016.

(51) Int. Cl.
| | | |
|---|---|---|
| *H04L 12/24* | (2006.01) | |
| *H04L 29/06* | (2006.01) | |
| *H04M 15/00* | (2006.01) | |
| *H04W 4/60* | (2018.01) | |
| *H04L 29/08* | (2006.01) | |

(Continued)

(52) U.S. Cl.
CPC .......... *H04L 65/40* (2013.01); *H04L 12/1403* (2013.01); *H04L 12/1407* (2013.01); *H04L 67/306* (2013.01); *H04M 15/64* (2013.01); *H04M 15/66* (2013.01); *H04M 15/70* (2013.01); *H04M 15/785* (2013.01); *H04M 15/854* (2013.01); *H04M 15/856* (2013.01);

(Continued)

(58) Field of Classification Search
CPC ... H04L 65/40; H04L 67/306; H04L 12/1407; H04L 12/1403; H04W 88/16; H04W 4/60; H04W 4/24; H04M 15/64; H04M 15/8214; H04M 15/856; H04M 15/854; H04M 15/785; H04M 15/70; H04M 15/66
USPC ......................................................... 709/224
See application file for complete search history.

(56) References Cited

U.S. PATENT DOCUMENTS

| | | |
|---|---|---|
| 5,027,388 A | 6/1991 | Bradshaw et al. |
| 8,522,241 B1 | 8/2013 | Vohra et al. |

(Continued)

FOREIGN PATENT DOCUMENTS

| | | |
|---|---|---|
| EP | 2249514 A1 | 11/2010 |
| JP | 2002-319963 A | 10/2002 |

(Continued)

OTHER PUBLICATIONS

PCTUS1765738_writen opinion dated Dec. 13, 2016 (Year: 2016).*

(Continued)

*Primary Examiner* — Moustafa M Meky
*Assistant Examiner* — Elizabeth Kassa
(74) *Attorney, Agent, or Firm* — Ray Quinney & Nebeker, P.C.; Thomas M. Hardman; Sunah K. Lee

(57) ABSTRACT

A method of and system for accommodating non-responsiveness of an online charging node in a networked system. A request is received from a subscriber. An online charging node is identified to be non-responsive. A default quota is assigned to the subscriber, defining a service usage threshold for the subscriber. Service is provided to the subscriber based on the default quota.

21 Claims, 5 Drawing Sheets

(51) Int. Cl.
*H04W 88/16* (2009.01)
*H04L 12/14* (2006.01)
*H04W 4/24* (2018.01)

(52) U.S. Cl.
CPC ............... *H04W 4/24* (2013.01); *H04W 4/60* (2018.02); *H04W 88/16* (2013.01); *H04M 15/8214* (2013.01)

(56) References Cited

U.S. PATENT DOCUMENTS

| | | | |
|---|---|---|---|
| 8,620,263 | B2 | 12/2013 | Ravishankar et al. |
| 9,013,993 | B2 | 4/2015 | Logan et al. |
| 9,094,538 | B2 | 7/2015 | Mohammed et al. |
| 9,544,751 | B2 | 1/2017 | McNamee et al. |
| 2003/0171114 | A1 | 9/2003 | Hastings |
| 2007/0174400 | A1 | 7/2007 | Cai et al. |
| 2009/0124284 | A1 | 5/2009 | Scherzer et al. |
| 2009/0300173 | A1 | 12/2009 | Bakman et al. |
| 2010/0035576 | A1 | 2/2010 | Jones et al. |
| 2010/0050172 | A1 | 2/2010 | Ferris |
| 2010/0317331 | A1 | 12/2010 | Miller |
| 2011/0125905 | A1 | 5/2011 | Baucke et al. |
| 2011/0211583 | A1 | 9/2011 | Seetharaman et al. |
| 2012/0030349 | A1 | 2/2012 | Sugai |
| 2012/0257499 | A1 | 10/2012 | Chatterjee et al. |
| 2013/0095815 | A1 | 4/2013 | Venkatraman et al. |
| 2013/0132854 | A1* | 5/2013 | Raleigh ............... G06F 3/0482 715/738 |
| 2013/0173804 | A1 | 7/2013 | Murthy et al. |
| 2013/0196615 | A1* | 8/2013 | Zalmanovitch ....... H04L 43/045 455/405 |
| 2013/0231080 | A1 | 9/2013 | Cheuk et al. |
| 2013/0267196 | A1 | 10/2013 | Leemet et al. |
| 2014/0040975 | A1* | 2/2014 | Raleigh ............... H04W 12/12 726/1 |
| 2014/0058908 | A1* | 2/2014 | Gupta ............... G06Q 40/12 705/30 |
| 2014/0098671 | A1 | 4/2014 | Raleigh et al. |
| 2014/0187199 | A1 | 7/2014 | Yan et al. |
| 2014/0189790 | A1* | 7/2014 | Mindler ............... H04L 65/80 726/3 |
| 2015/0215473 | A1* | 7/2015 | Li ............... H04M 15/64 370/259 |
| 2015/0222546 | A1 | 8/2015 | Van Phan et al. |
| 2016/0164752 | A1* | 6/2016 | Larsson ............ H04M 15/785 455/408 |
| 2016/0269566 | A1 | 9/2016 | Gundamaraju et al. |
| 2018/0124253 | A1* | 5/2018 | Xu ............... H04W 4/24 |
| 2018/0359655 | A1* | 12/2018 | Zevallos ........... H04W 28/0289 |

FOREIGN PATENT DOCUMENTS

| | | | |
|---|---|---|---|
| JP | 2010088013 A | 4/2010 | |
| JP | 2011-259440 A | 12/2011 | |
| WO | WO-2009071431 | 6/2009 | |
| WO | WO-2010066430 A1 | 6/2010 | |
| WO | WO 2014049433 * | 9/2013 | ............ H04L 12/14 |
| WO | WO-2014049433 A2 | 4/2014 | |
| WO | WO 2016124225 * | 2/2015 | ............ H04W 4/24 |
| WO | WO-2015131331 A1 | 9/2015 | |
| WO | WO-2016124225 A1 | 8/2016 | |

OTHER PUBLICATIONS

Extended European Search Report issued in EP 16790150.3; dated Mar. 18, 2019 (11 pages).

Extended European Search Report issued by the European Patent Office for European Patent Application No. 12868870.2 dated Sep. 4, 2015 (10 pgs.).

Gomez Rodriguez, M., et al., "A 3GPP System Architecture Evolution Virtualized Experimentation Infrastructure for Mobility Prototyping (Invited Paper)", Proc. Of the 4th International Conference on Testbeds and Research Infrastructures for the Development of Networks & Communities, 10 pgs. (Mar. 18, 2008).

International Search Report and Written Opinion as issued by the U.S. Patent and Trademark Office as international searching authority, issued in PCT/US16/31194, dated Aug. 16, 2016 (7 pages).

International Search Report and Written Opinion issued by the U.S. Patent and Trademark Office as International Searching Authority for International Patent Application No. PCT/US16/21744 dated Jun. 9, 2016 (8 pages).

Taniguchi, Y., et al., "Implementation and Evaluation of Cooperative Proxy Caching System for Video Streaming Services", Technical Report for the Institute of Electronics Information and Communication Engineers, IEICE, Japan, vol. 103, No. 650, pp. 13-18 (Feb. 5, 2014).

International Search Report and Written Opinion issued by the European Patent Office as Searching Authority, issued in International Application No. PCT/US17/065738, dated Mar. 26, 2018 (20 pages).

* cited by examiner

ONLINE CHARGING MECHANISMS DURING OCS NON-RESPONSIVENESS

CROSS-REFERENCE TO RELATED APPLICATIONS

This application claims the benefit under 35 U.S.C. § 119(e) to U.S. Provisional Application No. 62/433,414, entitled "ONLINE CHARGING MECHANISMS DURING OCS OUTAGE," filed on Dec. 13, 2016, the contents of which are incorporated by reference herein in its entirety.

FIELD OF INVENTION

The invention generally relates to telecommunications systems and, in particular, to "machine to machine" (M2M) and radio access network (RAN) communication systems.

BACKGROUND

Service providers use online charging servers to ensure that customers have enough quota or grants (e.g., for data) before a service request can be granted and/or services can be provided. In a typical system, user equipment requests to use a network resource, such as data, time, credits, quality of service (QOS), etc. A gateway communicates with an online charging server ("OCS") to identify an allocation of the requested resource. The OCS then communicates the allocation to the gateway, which then assists in providing services based on the desired allocation. The gateway can request updates from the OCS over the course of the session.

This process works well when the OCS is online and functioning. However, when the OCS has an outage or otherwise becomes non-responsive, user equipment can be denied service either before or during a session. While reducing or eliminating OCS non-responsiveness can help to mitigate this problem, a solution is needed that accommodates OCS non-responsiveness without interruption or denial of service to users.

SUMMARY OF THE INVENTION

Methods described herein can include receiving, at a gateway (e.g., a packet gateway "PGW"), a request from user equipment to initiate a session with, and request a quota from, an online charging server ("OCS"). Via the gateway, the online charging server may be determined (e.g., detected) to be non-responsive, and in response, a default quota is automatically granted to the user equipment. The default quota can be based on an identifier of a device, such as an access point name (APN), that is associated with the user equipment. In some implementations, the session is deleted after the automatic grant of the default quota to the user equipment.

In some embodiments, a method also includes transmitting an update to the online charging server after granting the default quota to the user equipment, the update comprising an amount of data consumed by the user equipment.

In some embodiments, a method also includes sending a request for an online quota (e.g., a for time, events, inbound/outbound volume, etc.) to the online charging server after automatically granting a default quota to the user equipment.

In some embodiments, a method also includes sending a request for an online quota to the online charging server before detecting, via the gateway, that the online charging server is non-responsive. The online quota can be received at the gateway from the online charging server before detecting, via the gateway, that the online charging server is non-responsive. In some such embodiments, an update is transmitted to the online charging server after the grant of the default quota to the user equipment, and the update can include an amount of data consumed by the user equipment.

In some embodiments, a method also includes initiating the session between the gateway and the online charging server and receiving an online quota from the online charging server. In some such implementations, the detection of the online charging server being non-responsive occurs after receiving the online quota from the online charging server.

In some aspects, a disclosed method of accommodating non-responsiveness of an online charging node in a networked system includes receiving a request from a subscriber; identifying that an online charging node is non-responsive; assigning a default quota to the subscriber, the default quota defining a service usage threshold for the subscriber; and providing service to the subscriber based on the default quota.

In some embodiments, the online charging node comprises an online charging server (OCS).

In some embodiments, the identifying and assigning steps are performed by a charging enforcement node, and wherein the online charging node is configured to provide a control message to the charging enforcement node. In some embodiments, the charging enforcement node comprises a packet gateway (PGW). In some embodiments, the charging enforcement node comprise a gateway GPRS support node (GGSN).

In some embodiments, the step of identifying that the online charging node is non-responsive includes detecting a lack of a heartbeat from the online charging node. In some embodiments, the step of identifying that the online charging node is non-responsive comprises identifying a timeout of the online charging node.

In some embodiments, the method further includes assigning the default quota to a session for the subscriber. In some embodiments, the method further includes assigning the default quota to at least one additional session.

In some embodiments, the providing service to the subscriber based on the default quota includes tracking a usage associated with the service. In some embodiments, the method further includes identifying that the online charging node has become responsive; and reconciling with the online charging node the usage associated with the service.

In other aspects, a disclosed method of accommodating non-responsiveness of an online charging node in a networked system includes receiving a request for service from a subscriber; transmitting a message to an online charging node to initiate a session for the subscriber; identifying that the online charging node is non-responsive; assigning a default quota to the subscriber, the default quota defining a service usage threshold for the subscriber; and providing service to the subscriber based on the default quota.

In some embodiments the online charging node comprises an online charging server (OCS).

In some embodiments, the transmitting, identifying, and assigning steps are performed by a charging enforcement node, and wherein the online charging node is configured to provide a control message to the charging enforcement node. In some embodiments, the charging enforcement node comprises a packet gateway (PGW). In some embodiments, wherein the charging enforcement node comprise a gateway GPRS support node (GGSN).

In some embodiments, the step of identifying that the online charging node is non-responsive includes detecting a lack of a heartbeat from the online charging node. In some embodiments, the step of identifying that the online charging node is non-responsive comprises identifying a timeout of the online charging node by identifying that a control message has not been received within a predetermined amount of time.

In some embodiments, the method further includes assigning the default quota to a session for the subscriber. In some embodiments, the method further includes assigning the default quota to at least one additional session.

In some embodiments, the providing service to the subscriber based on the default quota includes tracking a usage associated with the service. In some embodiments, the method further includes identifying that the online charging node has become responsive; and reconciling with the online charging node the usage associated with the service.

In some aspects, a disclosed method of accommodating non-responsiveness of an online charging node in a networked system includes receiving a request for service from a subscriber; transmitting a message to an online charging node to initiate a session for the subscriber; receiving a control message from the online charging node; providing service to the subscriber based on the control message; identifying that the online charging node is non-responsive; assigning a default quota to the subscriber, the default quota defining a service usage threshold for the subscriber; and providing continued service to the subscriber based on the default quota.

In some embodiments, the online charging node comprises an online charging server (OCS).

In some embodiments, the transmitting, receiving, identifying, and assigning steps are performed by a charging enforcement node, and wherein the online charging node is configured to provide the control message to the charging enforcement node.s In some embodiments, the charging enforcement node comprises a packet gateway (PGW). In some embodiments, the charging enforcement node comprise a gateway GPRS support node (GGSN).

In some embodiments, the step of identifying that the online charging node is non-responsive includes detecting a lack of a heartbeat from the online charging node. In some embodiments, the step of identifying that the online charging node is non-responsive comprises identifying a timeout of the online charging node by identifying that a control message has not been received within a predetermined amount of time.

In some embodiments, the method further includes assigning the default quota to a session for the subscriber. In some embodiments, the method further includes assigning the default quota to at least one additional session.

In some embodiments, the providing service to the subscriber based on the default quota includes tracking a usage associated with the service. In some embodiments, the method further includes identifying that the online charging node has become responsive; and reconciling with the online charging node the usage associated with the service.

BRIEF DESCRIPTION OF THE DRAWINGS

For a more complete understanding of various embodiments of the disclosed subject matter, reference is now made to the following descriptions taken in connection with the accompanying drawings in which.

DETAILED DESCRIPTION

Some embodiments described herein relate to methods for coping with server non-responsiveness in online charging system contexts, for example to facilitate delayed or offline delivery of OCS quota data and/or default quota data. Such online charging system contexts can include one or more Diameter credit-control applications in which end users (or "subscribers") request allocations of data, time, credits, etc. from an OCS as part of a service that he/she subscribes to. In some such traditional systems, if the OCS has an outage or otherwise becomes non-responsive, subscribers have been denied service. Attempts to mitigate these situations by traditional providers have often focused on reducing or eliminating the OCS downtime. By contrast, methods and systems described herein are designed to accommodate server non-responsiveness such that a subscriber experiences continuous service, and an accounting of quotas requested and/or used can be reconciled with the OCS once it comes back online. In some implementations, the quotas can be successfully reconciled with the OCS regardless of whether it comes back online during a session, after a session has terminated, or not at all.

In some embodiments, a "session" includes communication between a packet gateway (PGW) and an OCS. The PGW can be configured to identify that the OCS has become non-responsive by detecting that the Diameter "heartbeat" (e.g., watchdog messages, which can occur, for example, every 2-3 minutes) of the OCS has stopped, based on a transaction timeout (e.g., no response detected after, for example, 1-2 seconds), or based on any other method of identifying non-responsiveness. Non-responsiveness can include the server being unavailable, unreachable, offline, timed out, disconnected, overloaded, malfunctioning, shut down, in an outage condition, or any other type of non-responsiveness.

Figure 1:
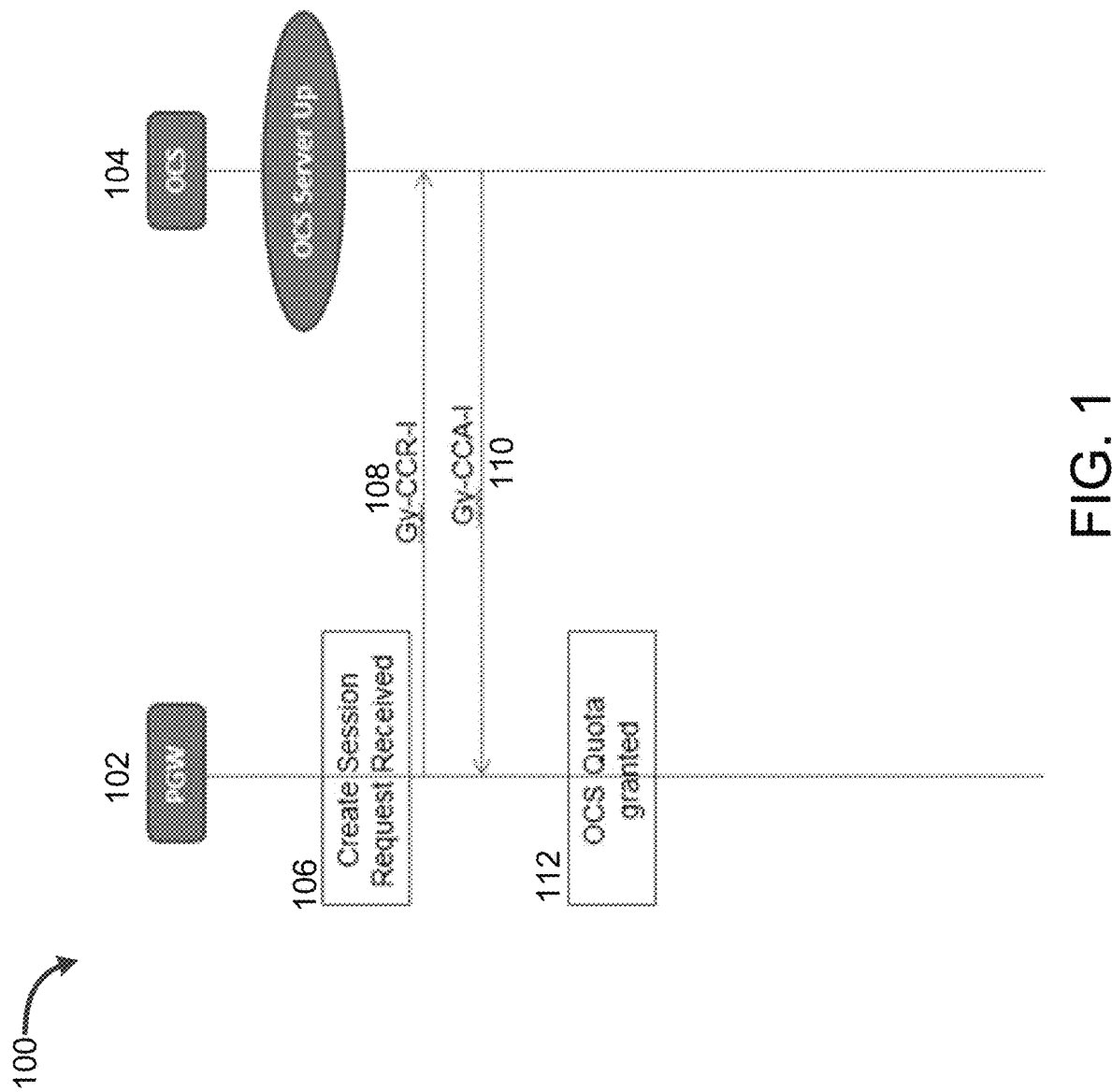
FIG. 1 is a flow diagram illustrating an online charging server (OCS) call flow in which the OCS is online and continuously functioning.

FIG. 1 is a flow diagram illustrating an online charging server (OCS) call flow 100 (illustrated herein to include, but not limited to, a Gy interface), in which the OCS 104 is online and continuously functioning. As shown in FIG. 1, the PGW 102 receives a "create session" request 106 (e.g., from user equipment/subscriber) and transmits an initial credit control request ("Gy-CCR-I") message 108 to the OCS 104. The Gy-CCR-I message 108 is a type of credit control request message used when a session based on credit control is required under the "Diameter" protocol. More specifically, the Gy-CCR-I message 108 is an initial message sent at the beginning of the session that must be sent before service is allowed to the user equipment. The PGW 102 receives an initial credit control acceptance ("Gy-CCA-I") message 110 back from the OCS 104 in response to the Gy-CCR-I message 108 acknowledging the GyCCR-I message 108 and indicating an acceptance or failure of the request. In some embodiments, the acceptance or failure of the request depends on whether the subscriber has enough credits. Based on the received Gy-CCA-I message 110, the PGW 102 determines that an OCS quota has been granted (112).

Figure 2:
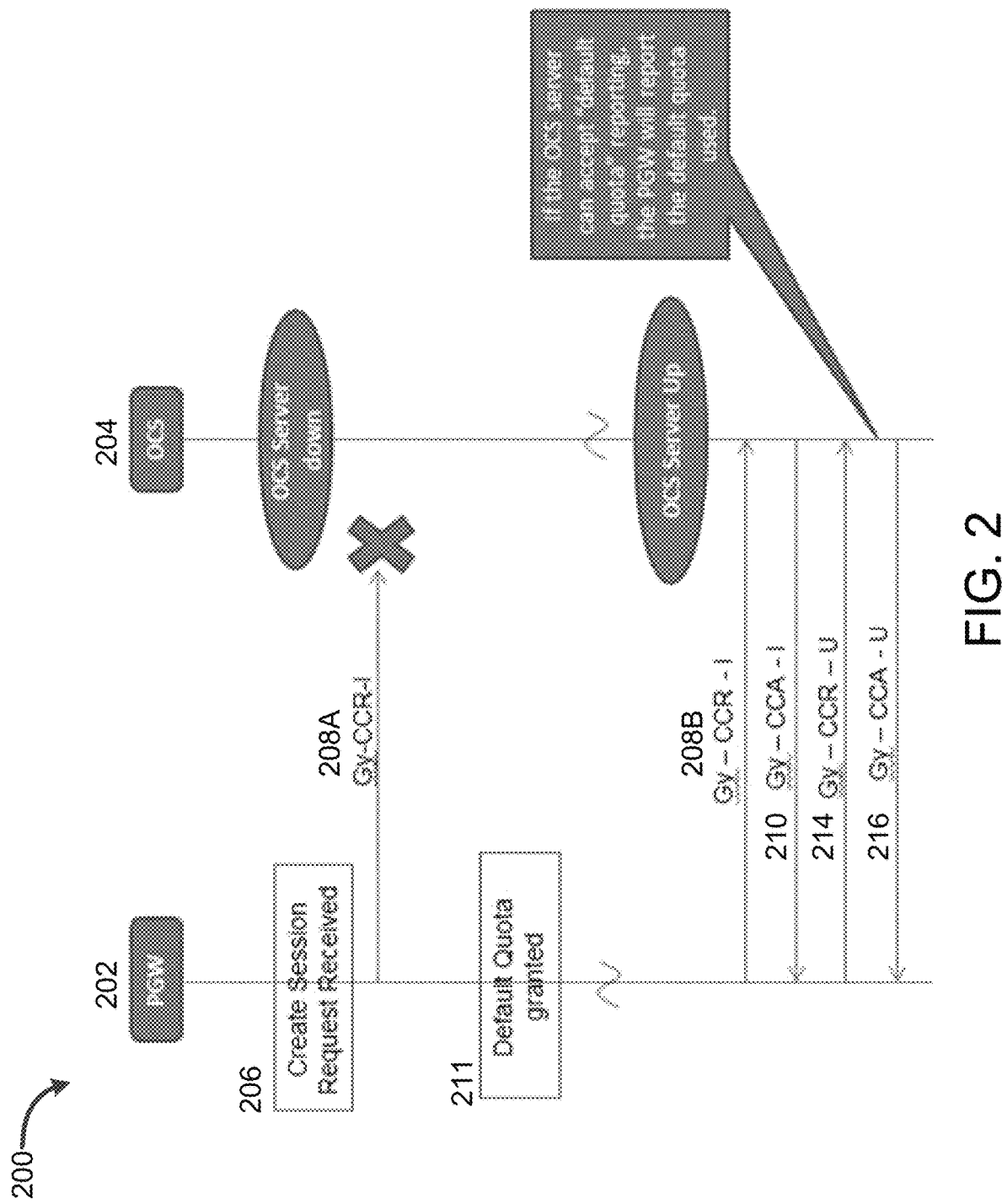
FIG. 2 is a flow diagram illustrating an OCS call flow in which the OCS is initially non-responsive and subsequently becomes responsive during a session.

FIG. 2 is a flow diagram illustrating an OCS call flow 200 (illustrated herein to include, but not limited to, a Gy interface), in which the OCS 204 is initially non-responsive and subsequently becomes reachable during a session. As shown in FIG. 2, the PGW 202, in response to a "create session" request 206 (e.g., from user equipment/a subscriber), attempts to transmit a Gy-CCR-I message 208A to the OCS 204, but the transmission does not reach the OCS 204 because it is non-responsive (e.g., is experiencing an outage or the network route is not available). In response to this failed transmission, the PGW 202 automatically grants a "default quota" 211 such that the end user (also "requestor" or subscriber) receives continuous service notwithstanding the OCS 204 being non-responsive. In some embodiments, the default quota can be customized to the requestor, for example based upon a database of preauthorized quota amounts, a history of OCS quota grants, etc. The requestor (and/or a device associated therewith) can be identified, for example, by his "access point name" (APN), and/or by a set of "policy and charging rules functions" (PCRFs) that are accessible to the PGW 202. For example, the PCRF can trigger a pre-configured set of parameters for a given APN. The PCRF can be a surrogate for saying that a subscriber is in a lower class and should be configured to have a lower default quota. The PGW can use any data available that is associated with an individual user or group of users in order to set the default quota.

Different network providers may choose to grant different default quotas from other network providers. Different network providers may also implement different selection criteria to choose among multiple default quotas depending on desired operating characteristics of the network. Network providers may choose small default quotas to avoid leakage. Conversely, network providers may choose large default quotas to avoid the risk of service interruption.

Subsequent to the granting of the default quota 211 by the PGW 202 (for example, upon detection by the PGW 202 that the OCS 204 is once again online, e.g., via a detecting a heartbeat from OCS 204 and/or receiving a response to a message), the PGW 202 can again transmit a Gy-CCR-I message (208B) to the OCS 204, and the transmission reaches the OCS 204 because it is online. A Gy-CCA-I message 210 is then sent back to the PGW 202 by the OCS 204. Next, according to some embodiments (in which the OCS 204 is configured to accept default quota reporting) the PGW 202 "updates" the OCS 204 by sending an update request message "Gy-CCR-U" 214 to the OCS 204. The Gy-CCR-U message 214 is an update request message that can be sent once a quota is reached, and can report the actual usage for all relevant statistics. The OCS 204 then acknowledges receipt of the Gy-CCR-U message 214 by sending an update acceptance message "Gy-CCA-U" 216 to the PGW 202. The Gy-CCA-U message 216 can indicate a new monitoring threshold, service, activation, or service deactivation.

In some embodiments, the full usage of the requester is reported to an operator via the update sent to the OCS 204, while in other embodiments, only the fact that the requestor has utilized the full amount of an already approved quota is reported to an operator via the update sent to the OCS 204. For example, according to an embodiment, the OCS 204 may not be configured to accept quotas provided from other sources, e.g., the PGW 202. The PGW 202 can reconcile the usage by the subscriber during the period of non-responsiveness without providing information about the default quota to the OCS 204. The PGW 202 can reconcile usage during the period of non-responsiveness by reporting usage based on quotas provided by the OCS before or after the period of non-responsiveness of the OCS 204. If the usage during the period of non-responsiveness of the OCS 204 exceeded a quota provided by the OCS 204, additional quotas can be requested until the full usage has been reported. Alternatively, usage beyond an approved quota can go unreported, or partially reported.

According to an embodiment, the OCS 204 may be configured to accept quotas provided from other sources, e.g., the PGW 202. The PGW 202 can reconcile usage during the period of non-responsiveness of the OCS 204 by providing the default quota to the OCS 204. According to another embodiment, the OCS 204 may be configured to accept usage reports without quotas from other sources, e.g., the PGW 202. The PGW 202 can reconcile usage during the period of non-responsiveness of the OCS 204 by reporting the full usage to the OCS 204.

Figure 3:
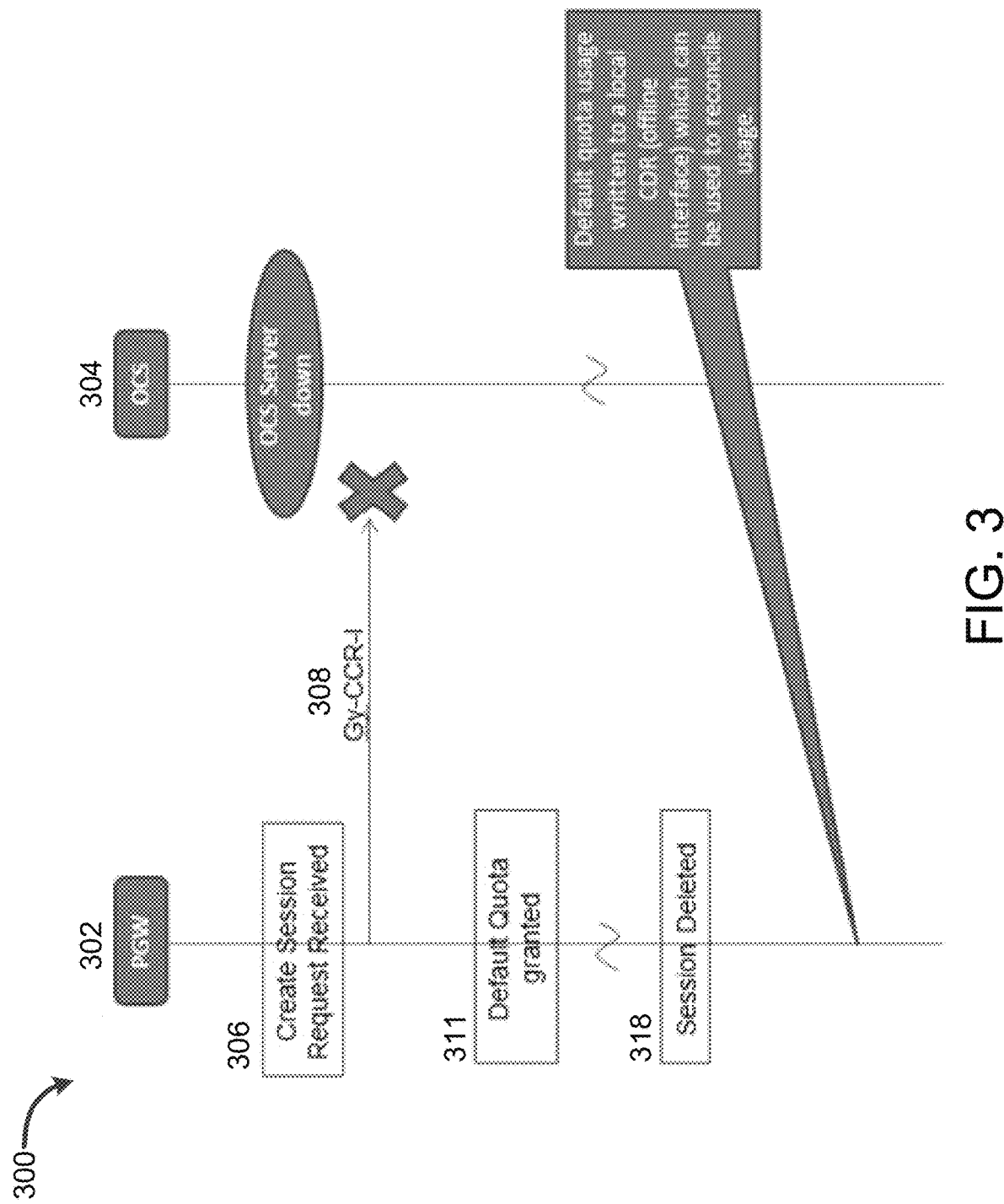
FIG. 3 is a flow diagram illustrating an OCS call flow in which the OCS is non-responsive and remains non-responsive throughout a session.

FIG. 3 is a flow diagram illustrating an OCS call flow 300 (illustrated herein to include, but not limited to, a Gy interface), in which the OCS 304 is non-responsive and remains non-responsive throughout a session. As shown in FIG. 3, the PGW 302, in response to a "create session" request 306 (e.g., from user equipment/a subscriber), attempts to transmit a Gy-CCR-I message 308 to the OCS 304, but the transmission does not reach the OCS 304 because it is non-responsive (e.g., is experiencing an outage or it is not available on the network). In response to this failed transmission, the PGW 302 (as discussed above with reference to FIG. 2) automatically grants a "default quota" 311 such that the requestor receives continuous service notwithstanding the OCS 304 being non-responsive. As described above, the default quota can be customized to the requestor, for example based upon a database of preauthorized quota amounts, a history of OCS quota grants, etc. The requestor can be identified, for example, by his "access point name" (APN), and/or by a set of "policy and charging rules functions" (PCRFs) that are accessible to the PGW 302. For example, the PCRF can trigger a pre-configured set of parameters for a given APN. The PCRF can be a surrogate for saying that a subscriber is in a lower class and should be configured to have a lower default quota. Subsequent to the granting of the default quota 311 by the PGW 302, the PGW 302 can delete the session 318, and the default quota usage can be written to a local charging data record (CDR) (e.g., an offline interface, another reachable online interface, or any server designated for data not yet communicated) which can be used to reconcile usage to the OCS (e.g., as discussed above with respect to FIG. 2) or other system(s), and/or transmitted via a file transfer protocol (FTP), or any other method of communicating and/or storing default quota usage.

Figure 4:
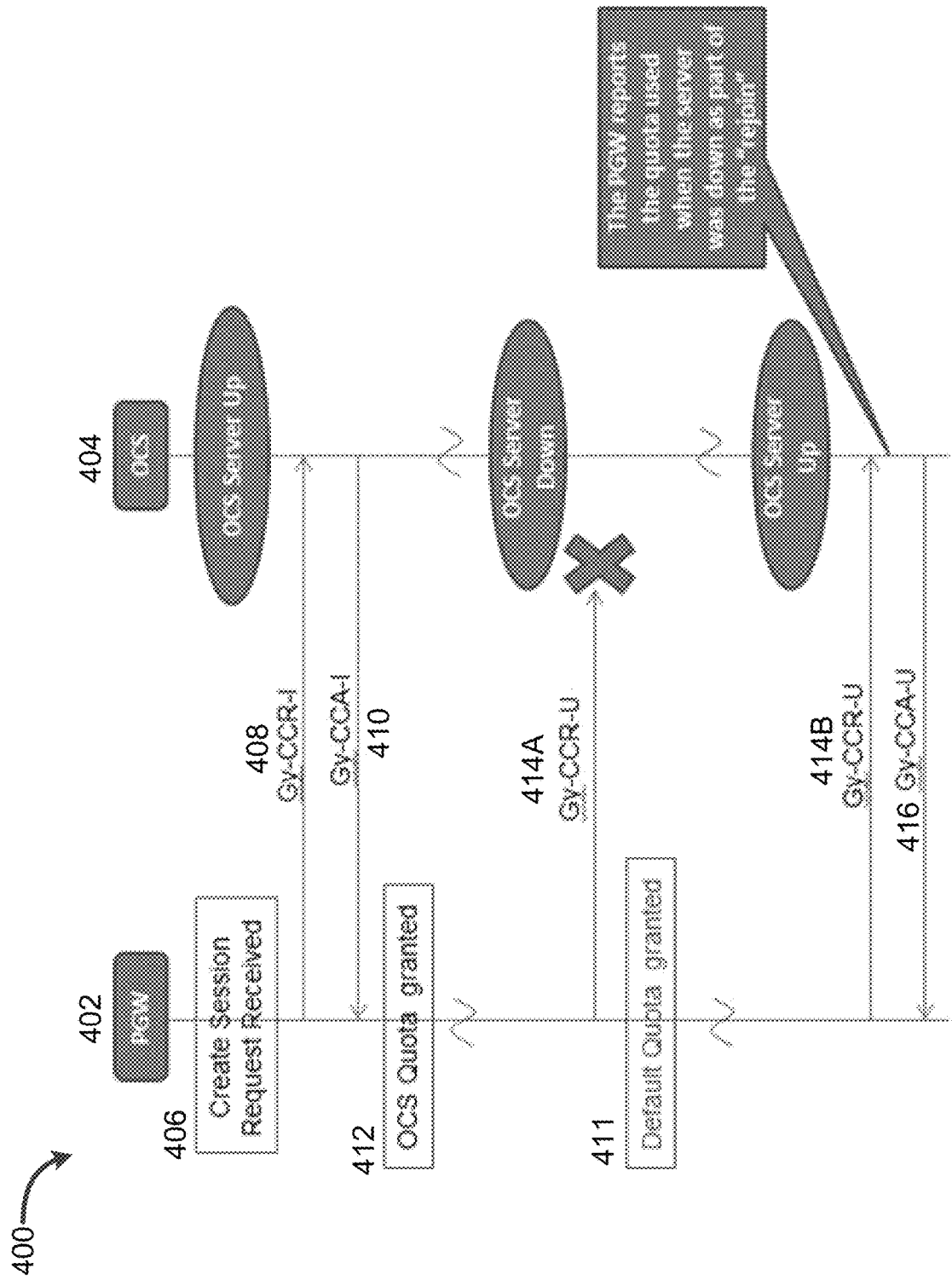
FIG. 4 is a flow diagram illustrating an OCS call flow in which the OCS is initially online, becomes non-responsive, and subsequently becomes responsive ("rejoins") during a session.

FIG. 4 is a flow diagram illustrating an OCS call flow (illustrated herein to include, but not limited to, a Gy interface), in which the OCS 404 is initially online, becomes non-responsive, and subsequently becomes responsive ("rejoins") during a session. As shown in FIG. 4, the PGW 402 receives a "create session" request 406 (e.g., from user equipment/a subscriber) and transmits a credit control request ("Gy-CCR-I") message 408 to the OCS 404, and receives a credit control acceptance ("Gy-CCA-I") message 410 back from the OCS 404. Based on the received Gy- CCA-I message 410, the PGW 402 determines that an OCS quota has been granted (412). Subsequent to the granting of the OCS quota 412, the PGW 402 may attempt to send an update Gy-CCR-U message 414A to the OCS 404 (e.g., to report that the subscriber who originally requested the quota referenced by Gy-CCR-I 408 used more than the allocation permitted by the previously granted OCS quota 412 or any other message to the OCS 404 for a different purpose), and finds that the OCS is unavailable. In response to this failed update transmission, the PGW 402 automatically grants a default quota 411 such that the user equipment's service remains uninterrupted. Subsequent to the PGW 402's granting of the default quota 411, the PGW 402 may again attempt to transmit an update Gy-CCR-U message (414B) to the OCS 404, at which time the OCS 404 may have rejoined the session (i.e., came back online). The Gy-CCR-U message (414B) can include data regarding the quota that was used by the requestor/subscriber while the OCS 404 was non-responsive as discussed above with respect to FIG. 2. The OCS may, in turn, acknowledge receipt of the update(s) by sending an update acceptance message "Gy-CCA-U" 416 to the PGW 402.

Alternatively, subsequent to the PGW 402's granting of the default quota 411, the PGW 402 may detect a heartbeat from the OCS 404 indicating that the OCS 404 has become reachable. The PGW 402 may then reconcile with the OCS 404 immediately using the reconciliation methods discussed herein depending on the configuration of the OCS 404, such as reporting usage or reporting the default quota 411. Alternatively, the PGW 402 may wait to reconcile with the OCS 404 until a later time, such as when the default quota 411 has been met.

Figure 5:
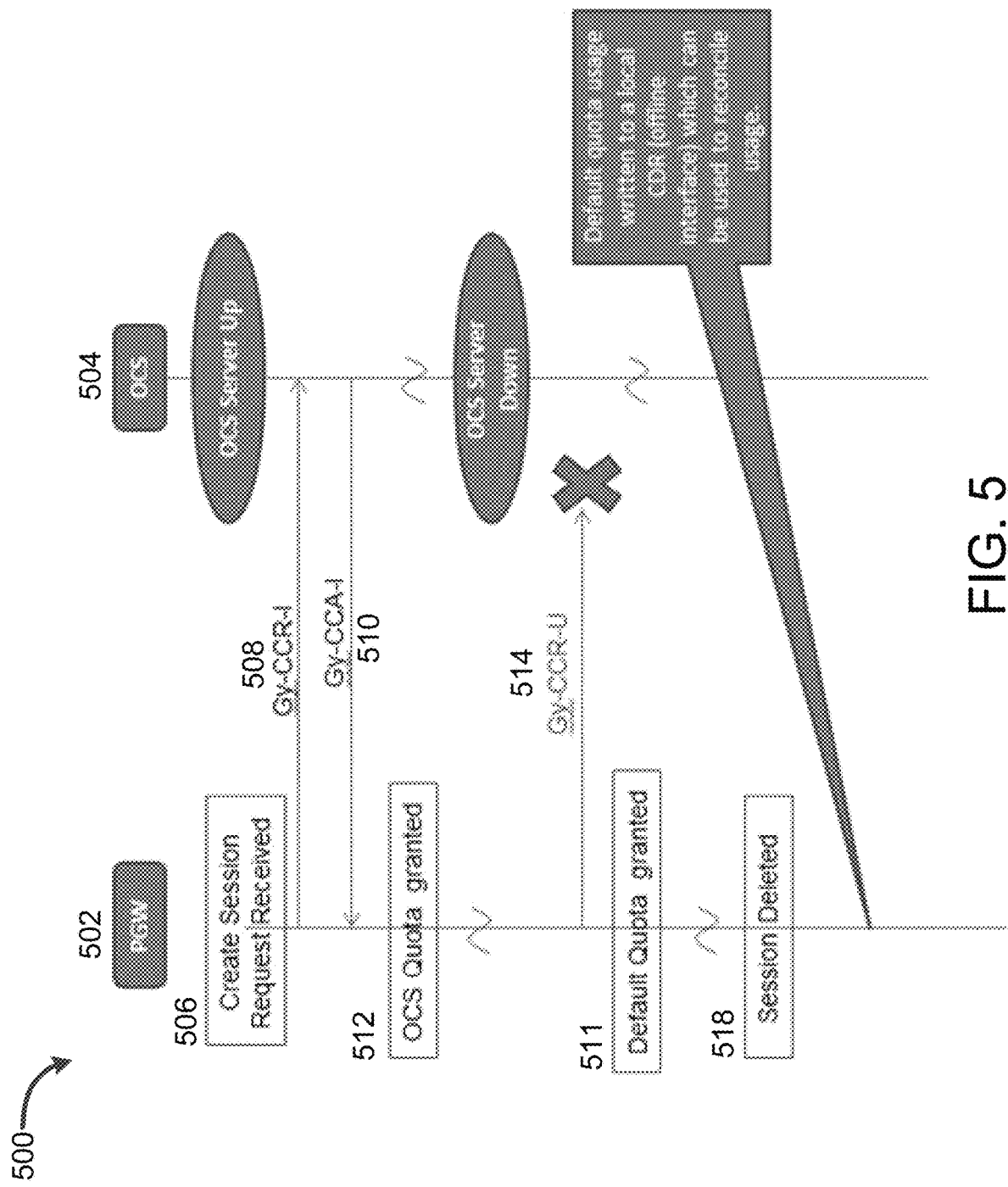
FIG. 5 is a flow diagram illustrating an OCS call flow in which the OCS is initially online, and subsequently becomes non-responsive and remains non-responsive throughout a session.

FIG. 5 is a flow diagram illustrating an OCS call flow 500 (illustrated herein to include, but not limited to, a Gy interface), in which the OCS 504 is initially online, and subsequently goes non-responsive and remains non-responsive throughout a session. As shown in FIG. 5, the PGW 502 receives a "create session" request 506 (e.g., from user equipment/subscriber) and transmits a credit control request ("Gy-CCR-I") message 508 to the OCS 504, and receives a credit control acceptance ("Gy-CCA-I") message 510 back from the OCS 504. Based on the received Gy-CCA-I message 510, the PGW 502 determines that an OCS quota has been granted (512). Subsequent to the granting of the OCS quota 512, the PGW 502 may attempt to send an update Gy-CCR-U message 514 to the OCS 504 (e.g., to report that the subscriber who originally requested the quota referenced by Gy-CCR-I 508 used more than the allocation permitted by the previously granted OCS quota 512), and finds that the OCS 504 is unavailable. In another embodiment the PGW 502 may identify unavailability of the OCS 504 based on its heartbeat. In response to unavailability of OCS 504, the PGW 502 automatically grants a default quota 511 such that the user equipment's service remains uninterrupted. Subsequent to the PGW 502's granting of the default quota 511, the PGW 502 can delete the session 518, and the default quota usage can be written to a local charging data record (CDR) (i.e., an offline interface) which can be used to reconcile usage to the OCS or other system(s) as discussed above with respect to FIG. 2.

In an embodiment a single system can perform all the techniques associated with FIGS. 1-5. For example, in an embodiment a single PGW can accommodate an OCS being non-responsive at any point in time. Alternatively, different systems may be implemented to perform each technique. In a further embodiment, a PGW may be configured to accommodate different types of OCSs that may or may not accept default quota reporting. Alternatively, a single PGW may be configured only to accommodate OCSs that either do or do not accept default reporting, but not both.

The techniques and systems disclosed herein are not limited to communications between a PGW and an OCS. For example, any component with policy and charging enforcement function (PCEF)/charging enforcement functionality could implement the techniques and systems disclosed herein. It should be appreciated that the techniques and systems disclosed herein could be implemented in existing network architecture (such as with a GSM/GPRS for 2G, GGSN for 3G, or other similar components in those releases or similar components/online charging nodes/charging enforcement nodes). A person having ordinary skill in the art would understand that the technique and systems disclosed herein would be applicable to future network architectures that have similar gateway/charging enforcement and online charging functionalities.

While the techniques and systems disclosed herein have been described with respect to an online charging system, the invention could also be applied to an offline or other charging systems (e.g., GTP' or a GZ server). For example, a CDR can be used to reconcile usage when a GTP' is non-responsive.

The techniques and systems disclosed herein may be implemented with various types of subscribers. For example, a single subscriber could be associated with more than one user equipment. A subscriber thus may refer to the specific user equipment, or to the entire set of user equipment associated therewith. Each user equipment associated with an end user or an account could be treated as an individual subscriber. Additionally, a default quota may be assigned during a single session or across a plurality of sessions.

The techniques and systems disclosed herein may be implemented as a computer program product for use with a network, computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a network, computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In the foregoing description, certain steps or processes can be performed on particular servers or as part of a particular engine. These descriptions are merely illustrative, as the specific steps can be performed on various hardware devices, including, but not limited to, server systems and/or mobile devices. Similarly, the division of where the particular steps are performed can vary, it being understood that no division or a different division is within the scope of the invention. Moreover, the use of "module" and/or other terms used to describe computer system processing is intended to be interchangeable and to represent logic or circuitry in which the functionality can be executed.

The invention claimed is:

1. A method of accommodating non-responsiveness of an online charging node in a networked system, comprising:
   receiving a request from a subscriber;
   identifying that an online charging node is non-responsive, wherein identifying that the online charging node is non-responsive comprises at least one of detecting a lack of a heartbeat from the online charging node or identifying a timeout of a request to the online charging node;
   assigning a default quota to the subscriber, the default quota being assigned by an entity other than the online charging node while the online charging node is non-responsive, the default quota defining a service usage threshold for the subscriber;
   providing service to the subscriber based on the default quota, wherein the providing service to the subscriber based on the default quota includes tracking a usage associated with the service;
   identifying that the online charging node has become responsive; and
   reconciling with the online charging node the usage associated with the service, wherein the reconciling with the online charging node the usage associated with the service includes reporting one or more of the tracked usage associated with the service or the default quota to the online charging node.

2. The method of claim 1, wherein the online charging node comprises an online charging server (OCS).

3. The method of claim 1, wherein the identifying and assigning steps are performed by a charging enforcement node, and wherein the online charging node is configured to provide a control message to the charging enforcement node.

4. The method of claim 3, wherein the charging enforcement node comprises a packet gateway (PGW).

5. The method of claim 3, wherein the charging enforcement node comprises a gateway GPRS support node (GGSN).

6. The method of claim 1, further comprising assigning the default quota to a session for the subscriber.

7. The method of claim 6, further comprising assigning the default quota to at least one additional session.

8. A method of accommodating non-responsiveness of an online charging node in a networked system, comprising:
   receiving a request for service from a subscriber;
   transmitting a message to an online charging node to initiate a session for the subscriber;
   identifying that the online charging node is non-responsive, wherein identifying that the online charging node is non-responsive comprises at least one of detecting a lack of a heartbeat from the online charging node or identifying a timeout of a request to the online charging node;
   assigning a default quota to the subscriber, the default quota being assigned by an entity other than the online charging node while the online charging node is non-responsive, the default quota defining a service usage threshold for the subscriber;
   providing service to the subscriber based on the default quota, wherein the providing service to the subscriber based on the default quota includes tracking a usage associated with the service;
   identifying that the online charging node has become responsive; and
   reconciling with the online charging node the usage associated with the service, wherein the reconciling with the online charging node the usage associated with the service includes reporting the default quota to the online charging node.

9. The method of claim 8, wherein the online charging node comprises an online charging server (OCS).

10. The method of claim 8, wherein the transmitting, identifying, and assigning steps are performed by a charging enforcement node, and wherein the online charging node is configured to provide a control message to the charging enforcement node.

11. The method of claim 10, wherein the charging enforcement node comprises a packet gateway (PGW).

12. The method of claim 10, wherein the charging enforcement node comprises a gateway GPRS support node (GGSN).

13. The method of claim 8, further comprising assigning the default quota to a session for the subscriber.

14. The method of claim 13, further comprising assigning the default quota to at least one additional session.

15. A system that is configured to accommodate non-responsiveness of an online charging node, comprising:
   one or more processors;
   memory in electronic communication with the one or more processors; and
   instructions stored in the memory, the instructions being executable by the one or more processors to:
     receive a request for service from a subscriber;
     transmit a message to the online charging node to initiate a session for the subscriber;
     receive a control message from the online charging node;
     provide service to the subscriber based on the control message;
     identify that the online charging node is non-responsive, wherein identifying that the online charging node is non-responsive comprises at least one of detecting a lack of a heartbeat from the online charging node or identifying a timeout of a request to the online charging node;
     determine an access point name (APN) and at least one policy and charging rules function (PCRF) associated with the subscriber;
     assign a default quota to the subscriber, the default quota being assigned by an entity other than the online charging node while the online charging node is non-responsive, the default quota being assigned based at least in part on the APN and the at least one PCRF, the default quota defining a service usage threshold for the subscriber;
     provide continued service to the subscriber based on the default quota, wherein the providing service to the subscriber based on the default quota includes tracking a usage associated with the service;

identify that the online charging node has become responsive; and reconcile with the online charging node the usage associated with the service, wherein the reconciling with the online charging node the usage associated with the service includes reporting the default quota to the online charging node.

16. The system of claim 15, wherein the online charging node comprises an online charging server (OCS).

17. The system of claim 15, wherein the transmitting, receiving, identifying, and assigning steps are performed by a charging enforcement node, and wherein the online charging node is configured to provide the control message to the charging enforcement node.

18. The system of claim 17, wherein the charging enforcement node comprises a packet gateway (PGW).

19. The system of claim 17, wherein the charging enforcement node comprises a gateway GPRS support node (GGSN).

20. The system of claim 15, further comprising assigning the default quota to the session for the subscriber.

21. The system of claim 20 further comprising assigning the default quota to at least one additional session.

* * * * *